W. M. PORTER AND E. H. SPRAGUE.
REPAIR BENCH.
APPLICATION FILED APR. 16, 1919.
1,313,604.
Patented Aug. 19, 1919.
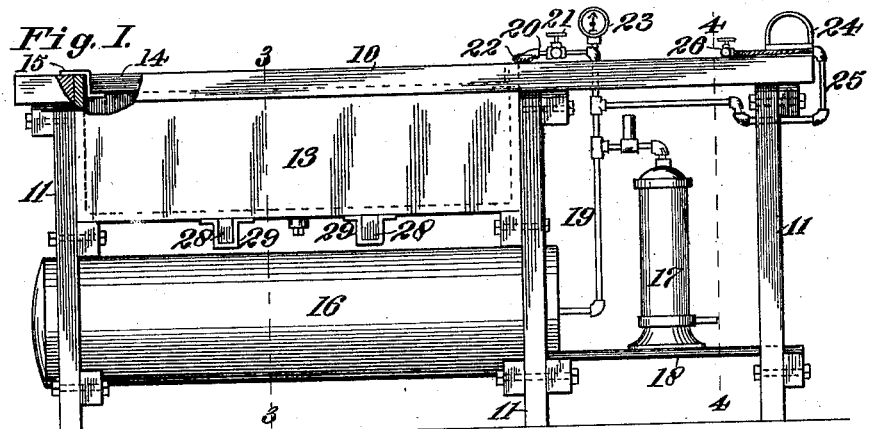
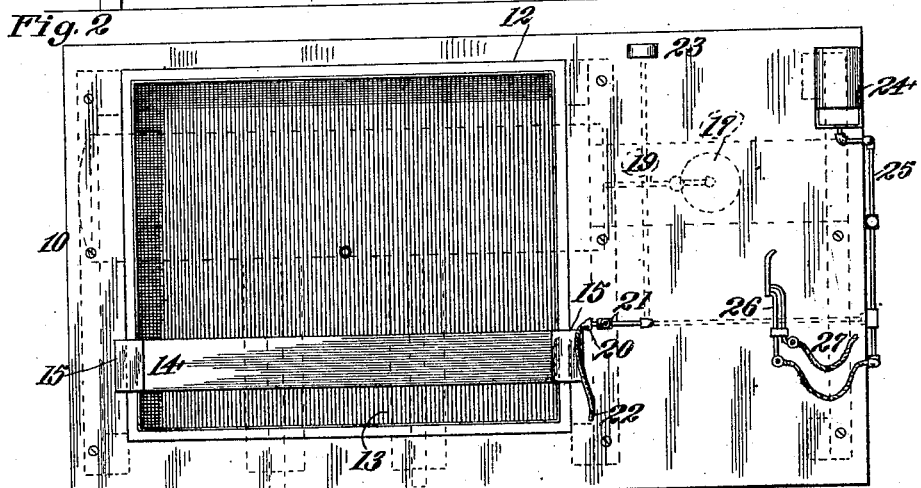
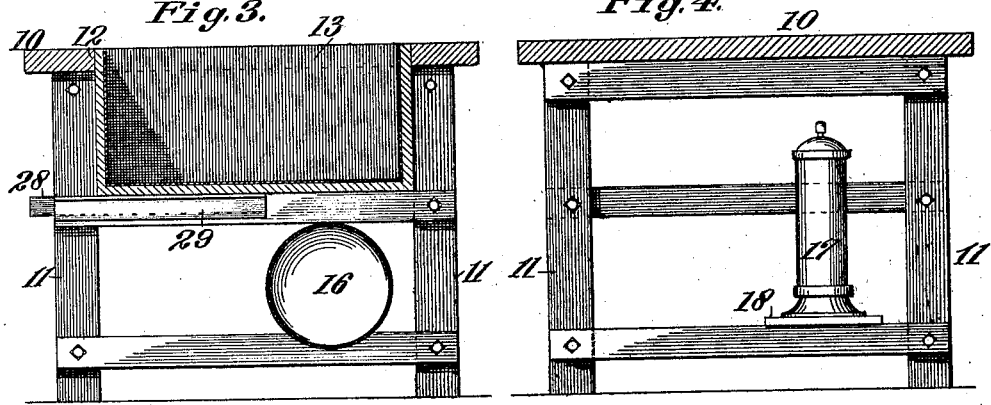
INVENTORS
Wildey M. Porter
Edward H. Sprague
BY Strong & Townsend
ATTORNEYS

UNITED STATES PATENT OFFICE.

WILDEY MERLIN PORTER AND EDWARD HARMOND SPRAGUE, OF SACRAMENTO, CALIFORNIA.

REPAIR-BENCH.

1,313,604.  Specification of Letters Patent.  Patented Aug. 19, 1919.

Application filed April 16, 1919. Serial No. 290,625.

*To all whom it may concern:*

Be it known that we, WILDEY MERLIN PORTER and EDWARD HARMOND SPRAGUE, both citizens of the United States, residing at Sacramento, in the county of Sacramento and State of California, have invented new and useful Improvements in Repair-Benches, of which the following is a specification.

This invention relates to a repair bench and particularly pertains to means for the ready repair of automobile radiators.

Due to the difficulty which automobile repair men have had in procuring proper equipment for testing and repairing automobile radiators, it has been found desirable to produce a bench especially designed for handling automobile radiators, and which is equipped with the proper accessories for repairing and testing the radiators.

It is the principal object of the present invention, therefore, to provide a bench of simple construction, fitted with means for testing automobile radiators and which is also supplied with blow torches and repair tools by which the various joints of a radiator may be reached and sealed.

The present invention contemplates the use of a radiator bench formed with a tank large enough to receive a radiator and adapted to carry sufficient water to permit the radiator to be completely submerged therein, and this tank is provided with a removable cover which will supplement the bench and allow the bench structure to be used without reference to the tank.

Mounted beneath the testing tank is an air supply reservoir and in connection with this reservoir, an air pump is provided to provide air under pressure by which the tank may be tested. Mounted upon the end of the bench are suitable repair and testing tools by which the repairs may be easily made.

The invention is illustrated by way of example in the accompanying drawings, in which—

Figure 1 is a view in side elevation, showing the complete bench with parts broken away to more clearly disclose a support for the tank cover.

Fig. 2 is a view in plan, illustrating the complete invention.

Fig. 3 is a view in vertical section, as seen on the line 3—3 of Fig. 1, showing the tank, the radiator supporting arms and the supply reservoir therebeneath.

Fig. 4 is a view in vertical section on line 4—4 of Fig. 1, showing the location of the air pump.

Referring to the drawings, 10 indicates a bench which is mounted upon a series of supporting legs 11. The bench is formed with a rectangular opening 12 at one end thereof, adapted to accommodate a testing tank 13. This tank is clearly shown in Fig. 3 as being metal-lined inside and being of a depth sufficient to accommodate an automobile radiator. The rectangular opening 12 in the bench is partially closed by a support board 14. This board fits within the opening an its upper surface lies flush with the surface of the bench. This provides a bench having a large working area for use when a radiator is tested. A plurality of Z-bars 15 are secured to the ends of the support board and act to support the same, as indicated in Fig. 1.

Properly supported beneath the tank 13 is an air supply reservoir 16. This reservoir is in communication with an air pump 17 which is supported upon the platform 18 fixed beneath the end of the bench. This air pump may be of any suitable design and is here shown as connecting with the reservoir by means of a pipe 19. This pipe also extends upwardly and is fitted with an outlet tube 20 carrying a regulating valve 21. On the end of this tube a hose connection 22 is provided. This connecting member is adapted to be positioned within the opened mouth of an automobile radiator and to supply it with sufficient air under pressure to locate the leaks and to test the strength of the radiator. An air gage 23 is secured in operative relation to the pipe 19 and indicates a pressure exerted by the air within the radiator. Mounted upon the edge of the work-bench is a small furnace 24 which is provided with gaseous fuel by means of a main 25. This pipe also connects with a blow torch 26 which is fitted with an air connecting tube 27 receiving its supply from the reservoir 16.

Secured beneath the tank are a pair of sliding arms 28. These arms are carried in channel members 29 and are adapted to be drawn outwardly at the side of the bench when a radiator is being tested. This makes it possible to turn the radiator in various positions and to reach all of its seams so that repair can be more easily made than would be possible if it were laid upon a flat bench.

In the operation of the present invention, the radiator is repaired upon the bench 10 and thereafter may be tested by removing the cover 14 of the bench and submerging the radiator in a body of water contained within the tank 13. At this time the hose connection 22 has been secured to the radiator and the pressure of the air within the circulating passages of the radiator will cause bubbles to appear in the water at the points of leakage. This insures that the necessary repairs may be easily made when thus located. In order to test the radiator for pressure, the valve 21 may be opened and the pressure read upon the gage 23. If further repair is required, the supporting arms 28 may be drawn from beneath the tank and the blow torch and furnace used as needed.

It will thus be seen that the bench here disclosed is particularly adapted and equipped for the testing and repair of radiators and combines the necessary tools and testing means therefor.

While we have shown the preferred form of our invention, it will be understood that various changes in the combination, construction and arrangement of parts may be made by those skilled in the art, without departing from the spirit of the invention as claimed.

Having thus described our invention, what we claim and desire to secure by Letters Patent is—

1. A radiator testing bench comprising a flat working bench, a tank in one end thereof and of sufficient dimensions to permit a radiator to be submerged therein, and a self-contained air supply unit carried by the bench and for connection with the radiator to be tested.

2. A radiator repair bench comprising a flat work bench, legs supporting the same, a rectangular opening in one end of said bench, a removable cover for said opening, a testing tank beneath said cover, an air reservoir secured beneath the tank, an air pump mounted beneath the bench and in communication with said reservoir, and pressure delivering and regulating means adapted to be connected with a radiator to be tested while it is submerged within the tank.

3. A radiator repair bench comprising a flat work bench, legs supporting the same, a rectangular opening in one end of said bench, a removable cover for said opening, a testing tank beneath said cover, an air reservoir secured beneath the tank, an air pump mounted beneath the bench and in communication with said reservoir, pressure delivering and regulating means adapted to be connected with a radiator to be tested while it is submerged within the tank, and extension arms secured beneath the tank and adapted to be drawn therefrom for the support of a radiator.

4. A radiator repair bench comprising a flat work bench, legs supporting the same, a rectangular opening in one end of said bench, a removable cover for said opening, a testing tank beneath said cover, an air reservoir secured beneath the tank, an air pump mounted beneath the bench and in communication with said reservoir, pressure delivering and regulating means adapted to be connected with a radiator to be tested while it is submerged within the tank, extension arms secured beneath the tank and adapted to be drawn therefrom for the support of a radiator, and a blow torch connected with a supply of fuel and connected with the air reservoir.

In testimony whereof we have hereunto set our hands in the presence of two subscribing witnesses.

WILDEY MERLIN PORTER.
EDWARD HARMOND SPRAGUE.

Witnesses:
R. B. TALBOT,
SILVEY PEARLE TINSLER.

Copies of this patent may be obtained for five cents each, by addressing the "Commissioner of Patents, Washington, D. C."